(12) United States Patent
Lee

(10) Patent No.: US 10,419,587 B2
(45) Date of Patent: Sep. 17, 2019

(54) INVERTER SYSTEM

(71) Applicant: LSIS CO., LTD., Gyeonggi-do (KR)

(72) Inventor: Bong-Ki Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 373 days.

(21) Appl. No.: 15/383,022

(22) Filed: Dec. 19, 2016

(65) Prior Publication Data

US 2017/0295262 A1    Oct. 12, 2017

(30) Foreign Application Priority Data

Apr. 8, 2016   (KR) .................. 10-2016-0043185

(51) Int. Cl.
| | |
|---|---|
| *G05B 19/02* | (2006.01) |
| *H04L 29/06* | (2006.01) |
| *H02M 7/537* | (2006.01) |
| *H04L 29/08* | (2006.01) |
| *H02M 7/48* | (2007.01) |
| *H02P 23/00* | (2016.01) |
| *H02P 27/06* | (2006.01) |

(52) U.S. Cl.
CPC ............. *H04L 69/02* (2013.01); *H02M 7/48* (2013.01); *H02M 7/537* (2013.01); *H02P 23/00* (2013.01); *H04L 67/12* (2013.01); *H04L 67/125* (2013.01); *H02P 27/06* (2013.01)

(58) Field of Classification Search
CPC ....... H04L 69/02; H04L 67/125; H04L 67/12; H02M 7/48; H02M 7/537; H02P 23/00; H02P 27/06

USPC .......................................................... 340/4.3
See application file for complete search history.

(56) References Cited

U.S. PATENT DOCUMENTS

| | | | |
|---|---|---|---|
| 9,063,525 B2 * | 6/2015 | Sanders | G05B 11/01 |
| 9,965,373 B2 * | 5/2018 | Suzuki | G06F 11/30 |
| 2011/0231159 A1 * | 9/2011 | Allert | H04L 12/44 |
| | | | 702/188 |
| 2012/0331195 A1 | 12/2012 | Pipho et al. | |
| 2014/0354194 A1 * | 12/2014 | Toba | H02P 5/74 |
| | | | 318/16 |

(Continued)

FOREIGN PATENT DOCUMENTS

| | | |
|---|---|---|
| EP | 2 541 428 A1 | 1/2013 |
| EP | 2 595 304 A2 | 5/2013 |

(Continued)

OTHER PUBLICATIONS

Search Report dated Jun. 21, 2017 issued in corresponding European Application No. 16201180.3.

(Continued)

*Primary Examiner* — Zhen Y Wu
(74) *Attorney, Agent, or Firm* — K&L Gates LLP

(57) ABSTRACT

Disclosed is an inverter system. A control part of the inverter system includes a control unit configured to set a communication protocol in association with a control unit of the power part, and transmit control data and receive power data according to the set communication protocol, and a power part of the inverter system includes a control unit configured to set a communication protocol in association with the control unit of the control part, and transmit power data and receive control data according to the set communication protocol.

8 Claims, 4 Drawing Sheets

(56) References Cited

U.S. PATENT DOCUMENTS

| | | | | |
|---|---|---|---|---|
| 2015/0137727 A1* | 5/2015 | Furutani | ............. | H02P 21/0089 |
| | | | | 318/566 |
| 2015/0375624 A1* | 12/2015 | Sawada | ..................... | B60L 3/12 |
| | | | | 701/22 |
| 2015/0377970 A1* | 12/2015 | Takei | ................... | B60W 10/08 |
| | | | | 318/490 |
| 2016/0036369 A1* | 2/2016 | Ando | ...................... | B60L 1/003 |
| | | | | 318/454 |
| 2017/0077711 A1* | 3/2017 | Oesselke | .................. | H02J 3/18 |
| 2017/0242450 A1* | 8/2017 | Becker | ...................... | G05F 1/66 |
| 2018/0074476 A1* | 3/2018 | Uematsu | ................ | G05B 19/19 |

FOREIGN PATENT DOCUMENTS

| | | | |
|---|---|---|---|
| JP | H5-153784 | A | 6/1993 |
| JP | H11-215834 | A | 8/1999 |
| JP | 2004-336907 | A | 11/2004 |
| JP | 2005-137162 | A | 5/2005 |
| JP | 2010-22175 | A | 1/2010 |
| JP | 2010-68684 | A | 3/2010 |
| JP | 2014-50137 | A | 3/2014 |

OTHER PUBLICATIONS

Office Action dated Aug. 15, 2017 issued in corresponding Japanese Application No. 2016-235317.

\* cited by examiner

FIG. 1
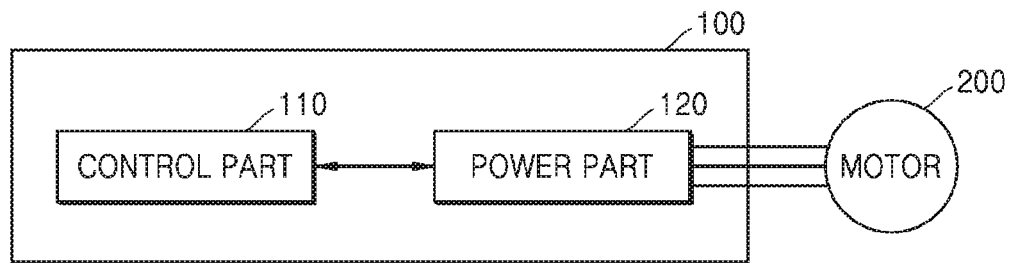
FIG. 2
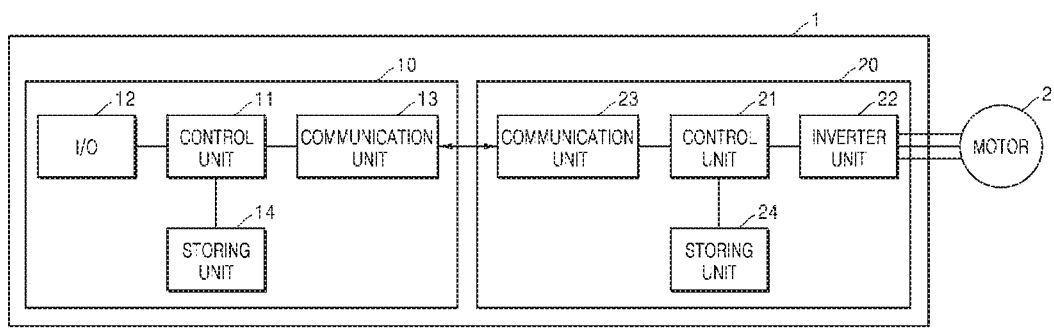
FIG. 3
| Address | Data Name | Data Type |
|---|---|---|
| C1 | Target Frequency | SLONG |
| C2 | Ramp Frequency | SLONG |
| C3 | Real Speed | SWORD |
| C4 | Control Command | BYTE |
| C5 | FAN Command | BYTE |
⋮

FIG 4

| Address | Data Name | Data Type |
|---|---|---|
| P1 | Current Data | SWORD |
| P2 | Motor Trip Data | WORD |
| P3 | FAN State | BYTE |
| P4 | DC Link Voltage | WORD |
| P5 | Motor State | BYTE |

| Address | Data Name |
|---|---|
| P1 | Current Data |
| P2 | Motor Trip Data |
| P4 | DC Link Voltage |

| Address | Data Name |
|---|---|
| C1 | Ramp Frequency |
| C4 | Control Command |
| C5 | FAN Command |

...

INVERTER SYSTEM

CROSS REFERENCE TO RELATED APPLICATION

This application claims the benefit of Korean Patent Application No. 10-2016-0043185, filed on Apr. 8, 2016, entitled "INVERTER SYSTEM", which is hereby incorporated by reference in its entirety into this application.

BACKGROUND

1. Technical Field

The present disclosure relates to an inverter system.

2. Description of the Related Art

Generally, an inverter is a device for receiving commercial electric power and applying three-phase power to a motor, and has been developed to have a variety of capacities according to a purpose and a size of the motor.

When such an inverter is developed, a power part and a control part are developed by being separated from each other for a reduction of development period and work sharing. FIG. 1 is a block diagram for schematically describing a conventional inverter. For safety and noise countermeasure, a power source is separated between a control part 110 of an inverter 100 and a power part 120 thereof.

Conventionally, a single micro-controller unit (MCU) is disposed at the control part 110, and numerous signals including a pulse width modulation (PWM) control signal, a power part sensor signal, a control part sensor signal, and the like are transmitted and received between the control part 110 and the power part 120. At this point, because a power source is separately provided in the control part 110 and the power part 120, the signals are transmitted and received through a plurality of power source separation elements.

In such a case, however, the single MCU executes all software so that there is a problem in which burden for software in such an MCU is increased. Also, all signal cables from the power part 120 should be insulated from each other such that there is a problem in that component costs are increased.

To address such problems, a control function of an inverter, which was processed in the conventional single MCU, is distributed according to a function and processed in a control part MCU and a power part MCU. That is, an MCU of the power part 120 controls a PWM, a power part, cooling device, and the like, and mutually transmits and receives data to and from an MCU of the control part 110.

At this point, these two MCUs should transmit and receive mutually required information therebetween through a communication. For effectively transmitting and receiving data, a mutual communication protocol is established to perform a communication between the two MCUs.

In such a case, however, a function of the power part 120 is changed or required data is different according to capacity so that various protocols are required, and all protocols of the control part 110 and the power part 120 should be corrected so that there is a problem in that inconvenience of a user may occur.

SUMMARY

An object of the present disclosure is to provide an inverter system capable of smoothly transmitting and receiving data without changing a protocol when software is changed or a power part is added.

To attain the object described above, an inverter system according to one embodiment of the present disclosure may include a storing unit configured to store a control data address, a control data name, and a control data type in a form of a library, and a list of power data addresses stored in a power part, and a second control unit configured to set a communication protocol in association with a first control unit of the power part, and transmit control data and receive power data according to the set communication protocol.

In one embodiment of the present disclosure, the second control unit may transmit an address with respect to necessary power data, and may receive data type information corresponding to the necessary power data from the first control unit.

In one embodiment of the present disclosure, the second control unit may transmit data corresponding to the address of the necessary power data to the first control unit.

In one embodiment of the present disclosure, the second control unit may receive an address with respect to necessary control data from the first control unit, and may transmit data type information corresponding to the necessary control data to the first control unit.

Also, to attain the object described above, an inverter system according to one embodiment of the present disclosure may include a storing unit configured to store a power data address, a power data name, and a power data type in a form of a library, and a list of control data addresses stored in a control part, and a second control unit configured to set a communication protocol in association with a first control unit of the control part, and transmit power data and receive control data according to the set communication protocol.

In one embodiment of the present disclosure, the second control unit may transmit an address with respect to necessary control data, and may receive data type information corresponding to the necessary control data from the first control unit.

In one embodiment of the present disclosure, the second control unit may transmit data corresponding to the address of the necessary control data to the first control unit.

In one embodiment of the present disclosure, the second control unit may receive an address with respect to necessary power data from the first control unit, and may transmit data type information corresponding to the necessary power data to the first control unit.

As described above, the present disclosure automatically create a communication protocol between the control units 11 and 21 of the control part 10 and the power part 20 and data is transmitted and received therebetween. Therefore, when a variety kind of power parts may be added, a separate protocol setting may not be requested so that there are effects in which development period may be reduced and communication efficiency may be increased.

BRIEF DESCRIPTION OF DRAWINGS

FIG. 1 is a block diagram for schematically describing a conventional inverter.

FIG. 2 is a block diagram for schematically describing an inverter system of one embodiment of the present disclosure.

FIG. 3 is one exemplary view for describing a data library that is stored in a storing unit of a control part.

FIG. 4 is one exemplary view for describing a data library that is stored in a storing unit of a power part of FIG. 2.

FIG. 5 is one exemplary view for describing a data list that is requested to a control unit of the power part by a control unit of the control part.

FIG. 6 is one exemplary view for describing a data list that is requested to the control unit of the control part by the control unit of the power part.

DETAILED DESCRIPTION

Figure 7:
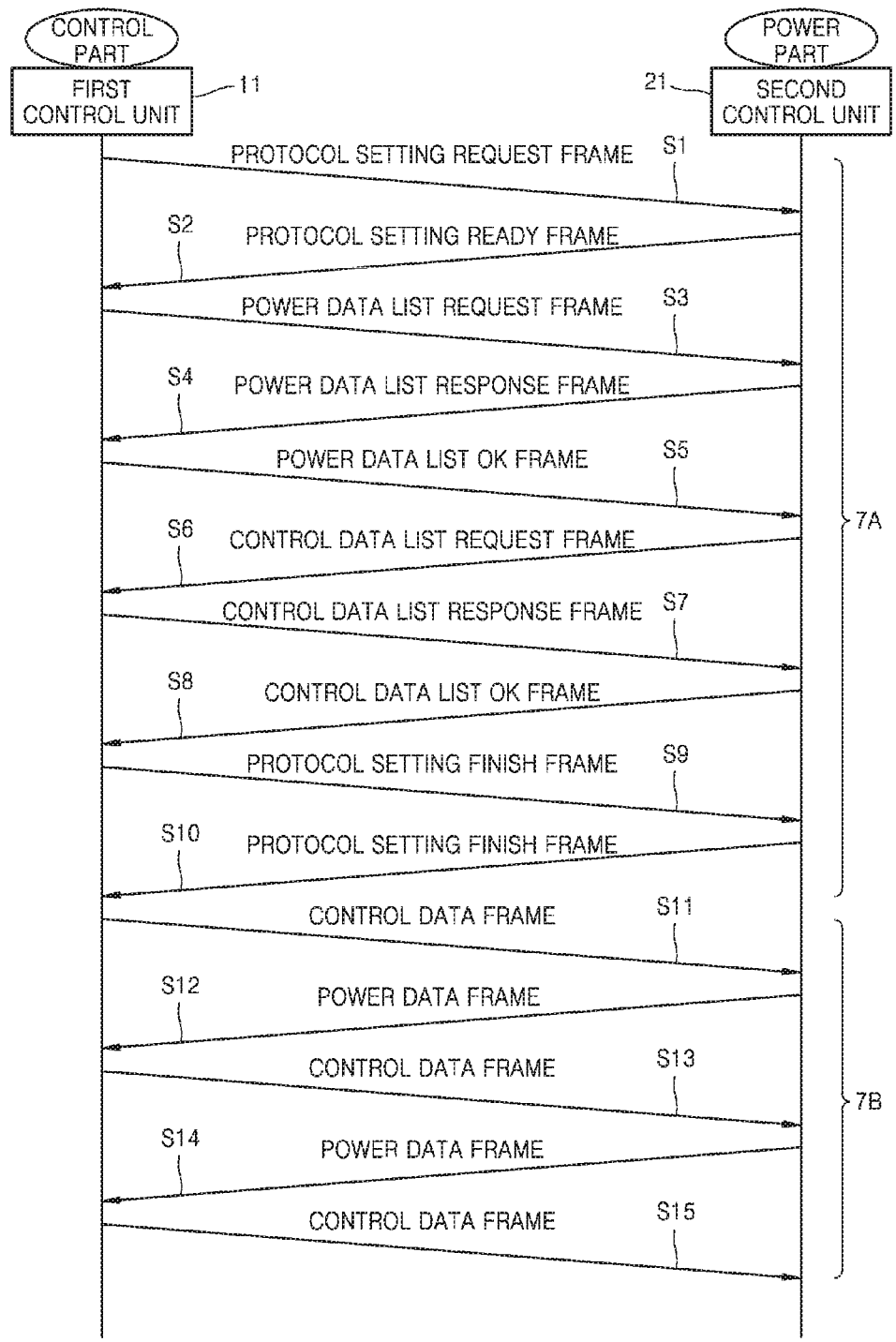
FIG. 7 is a time flow chart for describing a communication of first and second control units according to one embodiment of the present disclosure.

The present disclosure may be variously modified and will have a variety of embodiments so that specific embodiments will be exemplified in the drawings and will be described in detail. The specific embodiments disclosed herein, however, are not to be taken in a sense for limiting the present disclosure to these embodiments, but for explanation thereof and it should be understood that numerous other alternations, equivalents and substituents will be falling within the spirit and scope of the present disclosure.

Hereinafter, one preferred embodiment according to the present disclosure will be described in detail with reference to the accompanying drawings.

FIG. 2 is a block diagram for schematically describing an inverter system according to one embodiment of the present disclosure.

As shown in the drawing, an inverter system 1 is configured to provide a three-phase alternating current (AC) power source to a motor 2, and may include a control part 10 and a power part 20. Also, the inverter system 1 may further components in addition to the control part 10 and the power part 20, and component irrelevant to the present disclosure will be omitted.

In one embodiment of the present disclosure, the control part 10 may include a control unit 11, an input and output unit 12, and a communication unit 13, and a storing unit 14, and the power part 20 may include a control unit 21, an inverter unit 22, a communication unit 23, and a storing unit 24.

An inverter unit 22 of the power part 20 includes a plurality of switching devices (for example, an insulated-gate bipolar transistor (IGBT)). The control units 11 and 21 may be a micro-controller unit (MCU), but they are not limited thereto.

The control unit 11 may control the input and output unit 12 to communicate with external devices, and the communication unit 13 to communicate with the power part 20. Also, the control unit 11 may store terminal strip information in the storing unit 14 and may control operations of various applications.

The control unit 11 may store numerous data (hereinafter, referred to as 'control data') including control data and status data in the storing unit 14 as a library.

FIG. 3 is one exemplary view for describing a data library that is stored in the storing unit of the control part of FIG. 2.

As shown in FIG. 3, the control unit 11 may store information regarding a data address 3A, a data name 3B, and a data type 3C in the storing unit 14 as a library. At this point, the data type 3C may be 'BYTE (an 8-bit unsigned integer)', 'SBYTE (an 8-bit signed integer)', 'WORD (a 16-bit unsigned integer)', 'SWORD (a 16-bit signed integer)', 'LONG (a 32-bit unsigned integer)', 'SLONG (a 32-bit signed integer),' and the like.

The data name 3B is control data or status data of the control part 10, and, for example, a target frequency, a ramp frequency, a real speed, a control command, a FAN command are shown in the drawing, but the present disclosure is not limited thereto, and various control data or various status data may be stored as a library.

Even when the control part 10 is changed, an address of a data library may not be changed and thus it may be added to a last position when data is added.

The communication unit 13 may mutually transmit and receive data to and from the communication unit 23 of the power part 20 wider the control of the control unit 11.

The control unit 21 of the power part 20 may measure and control data (hereinafter, referred to as 'power data') including various signals of the power part 20, a control signal, a PWM signal, a three-phase current, a direct current (DC) link voltage, and the like, and may control the communication unit 23 to communicate with the control part 10.

The control unit 21 may store various data in the storing unit 24 as a library. FIG. 4 is one exemplary view for describing a data library that is stored in the storing unit of the power part of FIG. 2.

As shown in the drawing, the control unit 21 may store information regarding a data address 4A, a data name 4B, and a data type C in the storing unit 24 as a library. The data type 4C may be 'BYTE (an 8-bit unsigned integer)', 'SBYTE (an 8-bit signed integer)', 'WORD (a 16-bit unsigned integer)', 'SWORD (a 16-bit signed integer)', 'LONG (a 32-bit unsigned integer)', 'SLONG (a 32-bit signed integer),' and the like.

The data name 4B is control data and status data of the motor 2, and, for example, current data, motor trip data, a FAN state, a DC link voltage, a motor state, and the like are exemplified, but the present disclosure is not limited thereto, and various motor control data and various status data may be stored as a library.

Even when the power part 20 is changed, an address of a data library may not be changed and thus it may be added to a last position when data is added.

Also, the control unit 11 of the control part 10 may store a data address list of the library of a necessary power part 20, which is stored in the storing unit 24, in the storing unit 14.

The control unit 21 of the power part 20 may store a data address list of the library of a necessary control part 10, which is stored in the storing unit 14, in the storing unit 24.

The control unit 11 of the control part 10 and the control unit 21 of the power part 20 may respectively change a data list as necessary.

FIG. 5 is one exemplary view for describing a data list that is requested to the control unit 21 of the power part 20 by the control unit 11 of the control part 10, and FIG. 6 is one exemplary view for describing a data list that is requested to the control unit 11 of the control part 10 by the control unit 21 of the power part 20.

As shown in FIG. 5, the control unit 11 of the control part 10 may request to the storing unit 24 of the power part 20 for a list including a data address 5A of a library and a data name 5B corresponding to the data address 5A, which are stored in the storing unit 24. As shown in FIG. 6, the control unit 61 of the power part 20 may request to the storing unit 14 of the control part 10 for a list including a data address 6A of a library and a data name 6B corresponding to the data address 5A, which are stored in the storing unit 14.

The control unit 11 of the control part 10 and the control unit 21 of the power part 20 may mutually transmit and receive necessary data through a communication and may create a communication protocol. At this point, the control unit 11 of the control part 10 may operate as a master, and the control unit 21 of the power part 20 may operate as a slave. Hereinafter, for the convenience of description, it will be described by referring the control unit 11 of the control part 10 as a 'first control unit 11' and the control unit 21 of the power part 20 as a 'second control unit 21.'

Figure 8:
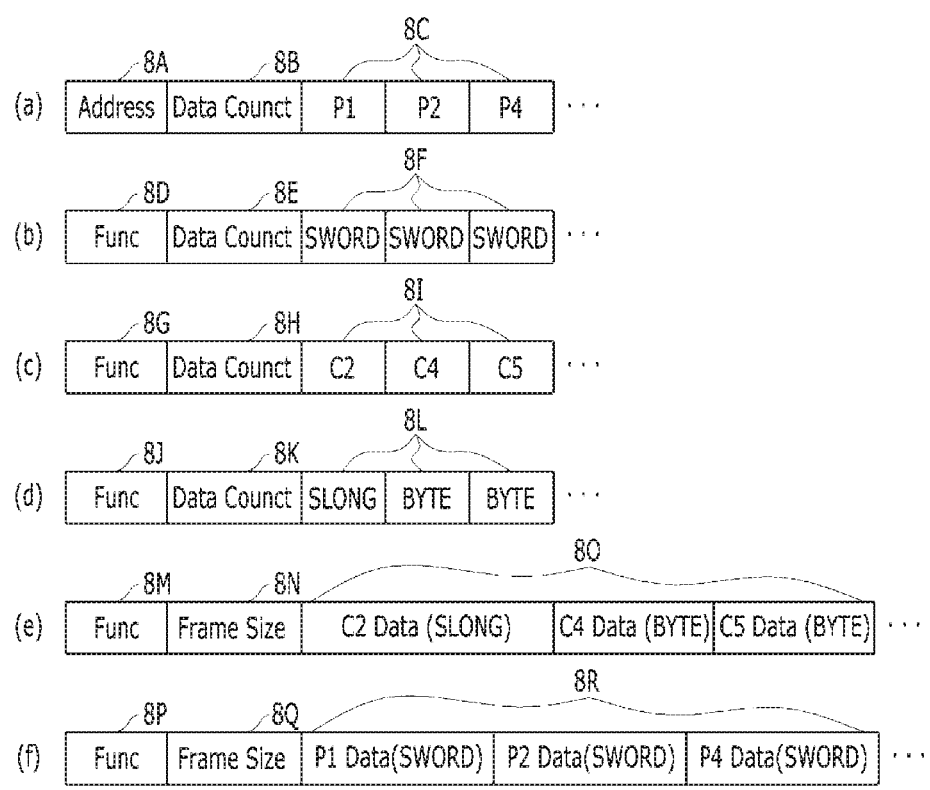
FIG. 8 is one exemplary view for describing a data frame that is transmitted and received between the first and second control units according to one embodiment of the present disclosure.

FIG. 7 is a time flow chart for describing a communication of first and second control units according to one embodiment of the present disclosure, a section 7A represents a section in which a communication protocol between the control unit 11 and the second control unit 21 is set up, and a section 7B represents a section in which the first control unit 11 and the second control unit 21 transmit and receive data to and from each other. FIG. 8 is one exemplary view for describing a data frame that is transmitted and received between the first and second control units according to one embodiment of the present disclosure.

As shown in FIG. 7, in one embodiment of the present disclosure, the first control unit 11 may transmit a protocol setting request frame to the second control unit 21 in Operation S1. As a response to this request, the second control unit 21 may transmit a protocol setting ready frame to the first control unit 11 in Operation S2.

The first control unit 11 may transmit a power data list request frame, thereby transmitting an address in a necessary power data list in Operation S3. Referring to FIG. 8A, one example of the power data list request frame is shown. In one embodiment of the present disclosure, the power data list request frame may include a field 8A representing that an address corresponds to the power data list request frame, a field 8B representing the number of data to be requested, and at least one field 8C representing an address of a power data library. The field representing the address of the power data library may be exemplified as configuring with three data sections, but it is apparent that the present disclosure is not limited thereto.

The second control unit 21 may transmit a power data list response frame, thereby transmitting data type information of data requested by the first control unit 11 in Operation S4. Referring to FIG. 8B, one example of the power data list response frame is shown. In one embodiment of the present disclosure, the power data list response frame may include a field 8D representing that it corresponds to the power data list response frame, a field 8E representing the number of data requested by the first control unit 11, and at least one field 8F representing a data type of data corresponding to an address of the field 8C in a power data library.

The first control unit 11 may transmit a power data list OK frame representing that it receives the power data list, thereby noticing that it is ready to receive data to be transmitted from the second control unit 21 in Operation S5.

Also, the second control unit 21 may transmit a control data list request frame, thereby transmitting an address in a necessary data list in Operation S6. Referring to 8C, one example of the control data list request frame is shown. In one embodiment of the present disclosure, the control data list request frame may include a field 8G representing that it corresponds to the control data list request frame, a field 8H representing the number of data to be requested, and at least one field 8I representing an address of a control data library. The field representing the address of a control data library is exemplified as configuring with three data sections, but it is apparent that the present disclosure is not limited thereto.

As a response to this request, the first control unit 11 may transmit a control data list response frame with respect to the requested control data list, thereby transmit data corresponding to a data type of the data requested by the second control unit 21 in Operation S7.

Referring to FIG. 8D, one example of the control data list response frame is shown. In one embodiment of the present disclosure, the control data list response frame may include a filed 8J representing that it corresponds to the control data list response frame, a field 8K representing the number of data requested by the second control unit 11, and at least one filed 8L representing a data type of a data corresponding to the address of the field 8I in a control data library.

The second control unit 21 may transmit a control data list OK frame representing that it has received the control data list, thereby noticing that it is ready to receive data to be transmitted from the first control unit 11.

Thereafter, the first control unit 11 may transmit a protocol setting finish frame for noticing that a setting is finished to the second control unit 21 in Operation S9, and the second control unit 21 may transmit a protocol setting finish frame for noticing that a setting is finished to the first control unit 11 in Operation S10.

As described above, after the protocol setting is completed, the first control unit 11 and the second unit 21 may transmit and receive set data to and from each other.

That is, the first control unit 11 may transmit data requested by the second control unit 21 in Operations S11, S13, and S15, and the second control unit 21 may also transit data requested by the first control unit 11.

Referring to FIG. 8E, one example of a control data frame transmitted from the first control unit 11 to the second control unit 21 is shown. The control data may be transmitted according to a set order, and a size thereof may be different according to a data type. In one embodiment of the present disclosure, the control data frame may include a field 8M representing that it corresponds to the control data frame, a field 8N representing a length of the control data frame, and a field 8O representing data corresponding to the address 8I of the data requested at FIG. 8C. However, these are merely examples, and thus the control data frame of the present disclosure may further include other fields.

Also, referring to FIG. 8F, one example of a power data frame transmitted from the second control unit 21 to the first control unit 11 is shown. The power data may be transmitted according to a set order, and a size thereof may be different according to a data type. In one embodiment of the present disclosure, the power data frame may include a field 8P representing that it corresponds to the power data frame, a field 8Q representing a length of the power data frame, and a field 8R representing data corresponding to the address 8C of the data requested at FIG. 8A. However, these are merely examples, and thus the power data frame of the present disclosure may further include other fields.

As described above, the present disclosure automatically create a communication protocol between the control units 11 and 21 of the control part 10 and the power part 20 and data is transmitted and received therebetween. Therefore, when a variety kind of power parts may be added, a separate protocol setting may not be requested so that development period may be reduced and communication efficiency may be increased.

The present disclosure has been described with reference to the embodiments shown in the drawings, but is merely an illustration, and it should be understood that numerous other modifications and equivalent other embodiments can be

| [Description of Reference Numerals] | |
| --- | --- |
| 1: Inverter System | 2: Motor |
| 10: Control Part | 20: Power Part |
| 11 and 21: Control Units | 12: Input and Output Unit |
| 22: Inverter Unit | 13 and 23: Communication Units |
| 14 and 24: Storing Units | |

What is claimed is:

1. An inverter system comprising:
a storing unit configured to store a control data address, a control data name, and a control data type in a form of a library, and a list of power data addresses stored in a power part; and
a first control unit configured to transmit control data and receive power data,
wherein the first control unit sets a communication protocol by transmitting a power data list and a control data list to a second control unit of the power part, thereby enabling transmission of the control data to the second control unit and reception of the power data from the second control unit according to the communication protocol,
wherein the first control unit and the second control unit transmit and receive a protocol setting frame prior to setting the communication protocol.

2. The inverter system of claim 1, wherein the first control unit transmits an address with respect to necessary power data, and receives data type information corresponding to the necessary power data from the second control unit.

3. The inverter system of claim 2, wherein the first control unit transmits data corresponding to the address of the necessary power data to the second control unit.

4. The inverter system of claim 1, wherein the first control unit receives an address with respect to necessary control data from the second control unit, and transmits data type information corresponding to the necessary control data to the second control unit.

5. An inverter system comprising:
a storing unit configured to store a power data address, a power data name, and a power data type in a form of a library, and a list of control data addresses stored in a control part; and
a second control unit configured to set a communication protocol by transmitting a power data list and a control data list to a first control unit of the control part, thereby enabling transmission of power data to the first control unit and receive reception of control data from the first control unit according to the communication protocol,
wherein the first control unit and the second control unit transmit and receive a protocol setting frame prior to setting the communication protocol.

6. The inverter system of claim 5, wherein the second control unit transmits an address with respect to necessary control data, and receives data type information corresponding to the necessary control data from the first control unit.

7. The inverter system of claim 6, wherein the second control unit transmits data corresponding to the address of the necessary power data to the first control unit.

8. The inverter system of claim 5, wherein the second control unit receives an address with respect to necessary power data from the first control unit, and transmits data type information corresponding to the necessary power data to the first control unit.

\* \* \* \* \*